(12) United States Patent
Ramsey et al.

(10) Patent No.: US 6,215,288 B1
(45) Date of Patent: Apr. 10, 2001

(54) ULTRA-LOW POWER SWITCHING REGULATOR METHOD AND APPARATUS

(75) Inventors: Carl A. Ramsey, Mariottsville; Eric H. Naviasky, Ellicott City, both of MD (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 09/513,338

(22) Filed: Feb. 25, 2000

(51) Int. Cl.[7] ..................................................... G05F 1/613
(52) U.S. Cl. ........................ 323/224; 323/282; 323/284; 323/285
(58) Field of Search ..................................... 323/282, 284, 323/283, 224, 285, 288

(56) References Cited

U.S. PATENT DOCUMENTS

| | | | |
|---|---|---|---|
| 5,541,499 | 7/1996 | Villard | 323/268 |
| 5,592,072 | 1/1997 | Brown | 323/268 |
| 5,945,820 | * 8/1999 | Namgoong et al. | 323/282 |
| 5,959,443 | * 9/1999 | Littlefield | 323/284 |
| 5,994,885 | * 11/1999 | Wilcox et al. | 323/287 |
| 5,998,977 | 12/1999 | Hsu et al. | 323/272 |

OTHER PUBLICATIONS

U.S. Patent Application Serial No. 09/513,339, filed Feb. 25, 2000, by inventors Carl A. Ramsey et al.

Vishay Siliconix, New Product Description, Si9167, 600–mA Synchronous Buck Converter for 2–Cell Li+ Cellular Phones, Document No. 70898, S–63920, Rev. C, Aug. 23, 1999.

Maxim Integrated Products, Product Description, MAX1677, Compact, High–Efficiency, Dual–Output Step–Up and LCD Bias DC–DC Converter, 19–1403; Rev 0; Nov. 1998.

Maxim Integrated Products, Product Description, MAX1692, Low–Noise, 5.5V–Input, PWM Step–Down Regulator, 19–1400; Rev 0; Nov. 1998.

Maxim Integrated Products, Product Description, MAX748A/MAX763A, 3.3V. Step–Down, Current–Mode PWM DC–DC Converters, 19–0190; Rev 0; Sep. 1993.

Impala Linear Corporation, Product Description, ILC6390/1, SOT–89 Step–Up PFM Switcher with Auto–Load Sense, Jun. 1996.

Dixon, Lloyd H., Jr., "Switching Power Supply Topology Review", Unitrode Power Supply Design Manual, published by Unitrode Corporation, Lexington, Massachusetts, 1985. No Month.

Linear Technology Corporation, "Design Notes —A Simple Ultra–Low Dropout Regulator", No. 32 in a series, Mar. 1990.

* cited by examiner

*Primary Examiner*—Shawn Riley
(74) *Attorney, Agent, or Firm*—Lyon & Lyon LLP

(57) ABSTRACT

A low-power controller for a discontinuous switched mode power converter. The controller has an inductor current sensing circuit to measure the inductor current flowing through an inductive charge storage element as well as an output voltage sensing circuit to monitor output voltage. The controller monitors both the converter output voltage and the inductor current and uses this information to modulate a peak inductor current trip point and controller switching frequency according to a control law curve in order to regulate converter output voltage. The controller prevents the switching frequency from falling below a predetermined minimum frequency. The control law curve is selectable to specify controller operation according to a desired combination of minimum switching frequency and maximum peak inductor current.

31 Claims, 18 Drawing Sheets

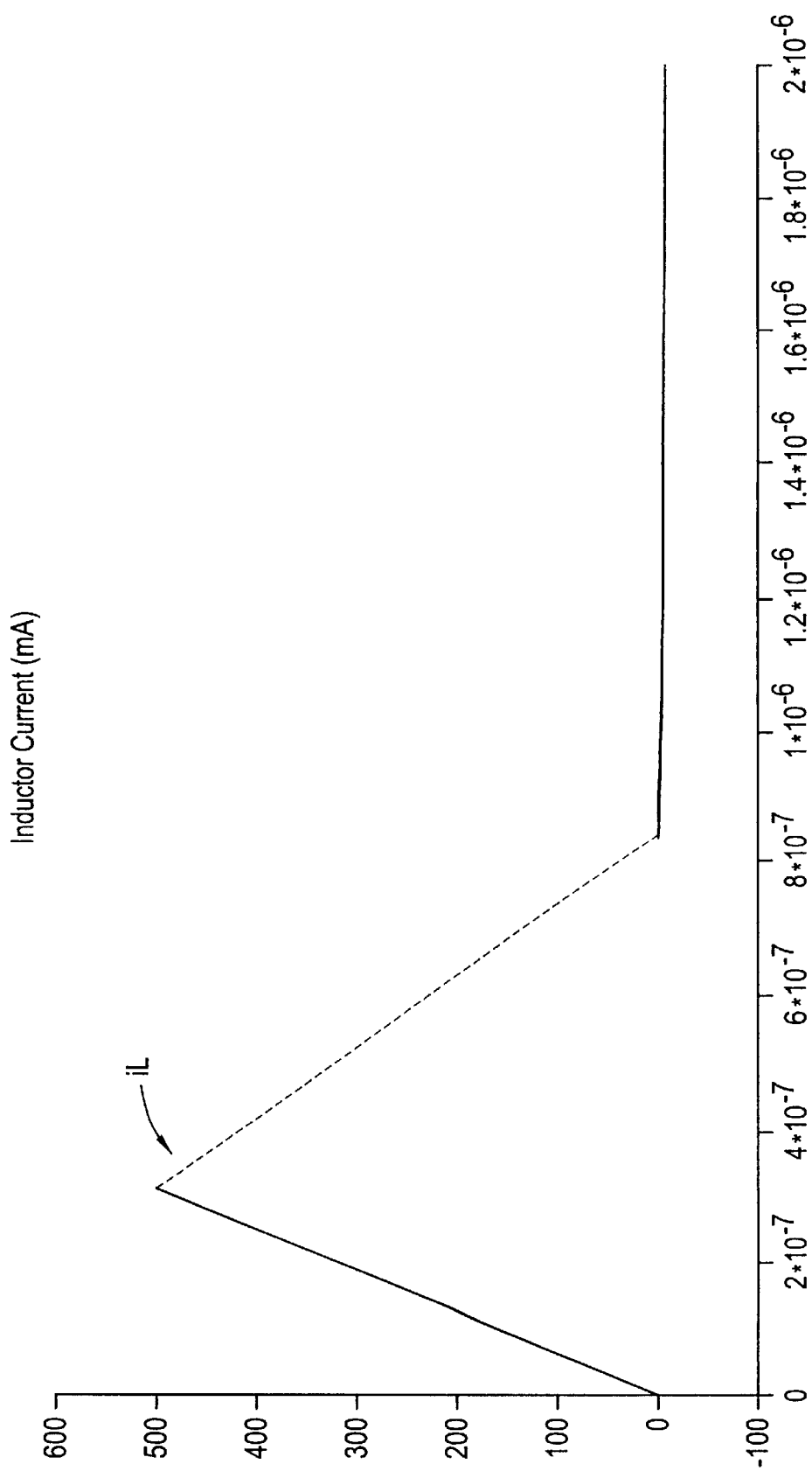

Output Voltage

ULTRA-LOW POWER SWITCHING REGULATOR METHOD AND APPARATUS

SUMMARY OF THE INVENTION

The present invention provides a method and apparatus for a power converter having a mode of operation in which the converter operates in discontinuous mode at a reduced switching frequency while further providing a control circuit with reduced power requirements and effective DC and transient regulation. The present invention also controls other critical parameters, such as, but not limited to, the minimum switching frequency and maximum peak switch current.

The present invention utilizes a variable frequency mode of operation that provides high efficiencies at low output currents. A power converter according to the present invention is preferably operated in discontinuous mode, and the peak current to which the inductor charges during each switch cycle is varied by the operation of a control circuit. More specifically, a low-power circuit is provided that modulates the peak current trip point to control the switching frequency and drive the converter toward a desired frequency of operation. The peak current trip point and switching frequency are reduced as the output current drops in order to maximize efficiency, but the switching frequency is prevented from dropping below a pre-determined frequency to avoid the generation of noise in the audio range. The peak current and switching frequency are increased as the output current increases, but the peak current automatically asymptotically approaches a pre-determined limit to protect the switching devices from excessive currents. In contrast to the "burst-mode" converter, the converter of the present invention does not require the high bandwidth continuous control loop used during fixed frequency operation, allowing this circuitry to be powered off to reduce quiescent power and increase efficiency at low output currents.

In a preferred embodiment, a converter according to the present invention reduces switching frequency to about 50 KHz, thereby reducing switch drive current from 4 milliAmperes, typically, to about 100 microAmperes. Furthermore, a converter according to the present invention reduces control circuit current draw down from about 600 to 800 microAmperes to about 200 to 300 microAmperes.

In one aspect, a converter according to the present invention modulates the peak switch current to control switching frequency based on a control law curve determined by control circuit elements. This frequency curve can be adjusted by the designer to optimize various operational parameters.

In another aspect, a converter according to the present invention controls the switching frequency and compensates for variations in internal and external components and changes in input voltage/output voltage, thereby extending the useful input voltage range by compensating for nonlinear inductor currents that occur at small input/output voltage ratios.

A converter according to the present invention provides automatic peak current limiting in the power switches without the addition of any additional control circuitry which would draw additional quiescent current. Further, a converter according to the present invention automatically prevents the switching frequency from dropping below a pre-defined level, preventing the converter from generating noise in the audible range.

Additionally, a converter according to the present invention has reduced bandwidth requirements for the control circuitry, which allows the use of low power circuits to reduce quiescent power and increase efficiency.

Thus, the present invention provides a converter having reduced switching frequency to minimize switching losses, and having reduced control circuit power requirements to reduce quiescent losses, while avoiding some problems encountered by other methods.

BRIEF DESCRIPTION OF THE DRAWINGS

FIG. 3C shows an example of variation in inductor current over time during a single discontinuous-mode switching cycle;

DETAILED DESCRIPTION OF THE PREFERRED EMBODIMENTS

Independent of battery technology and construction, operating environment and other such factors, the power requirements of a portable electronic device determine the useful battery life. Thus, the power requirements of the circuitry comprising a given portable electronic device form a critical engineering design parameter. Advances in the state of the art have resulted in the availability of components capable of operating at increasingly lower voltage and current specifications, but these components require correspondingly tighter tolerances.

While allowed to vary within specified tolerances, the voltage requirements of the circuitry of a portable electronic device remain constant over time. This circuit input voltage must remain within the specified tolerances in order for the device circuitry to function reliably. In contrast, the voltage available from the power source, such as a battery, varies over time due to a variety of factors including dissipation over time of the charge maintained by the battery, temperature and other external environmental conditions, and contact corrosion.

In order to provide a constant supply of voltage to the device circuitry within the specified required tolerances, a power converter device is typically used. The power converter takes the power source voltage as an input and converts it to and maintains it at the desired output voltage signal. The power converter further typically includes circuitry to regulate the power converter output within the specified circuit input voltage tolerances for wide deviations in the power source signal. The power converter output signal is said to be in regulation when provided within the specified circuit input voltage tolerances.

Because the components of the power converter device also dissipate power, it is desirable that the power converter be designed to function as efficiently as possible in regulating its output. The less efficient (in terms of power dissipation) the power converter, the faster the power source will be dissipated, and the useful life of the portable electronic device for a given battery charge will be shortened proportionately.

One particular type of power converter used in portable electronic device applications is the switch-mode power converter. Switch-mode power converters are used to convert a varying source voltage (such as that provided by a battery power source as it is discharged over time) to a higher or lower controlled voltage output. The switching action of the converter converts the DC voltage provided by the power source into an AC signal in the form of a square wave, which is then filtered to remove the high frequency components and create a DC output voltage. The switch control signals are modulated to control the transfer of voltage from the input of the power converter to its output, and to regulate the output voltage to the desired value.

Figure 1:
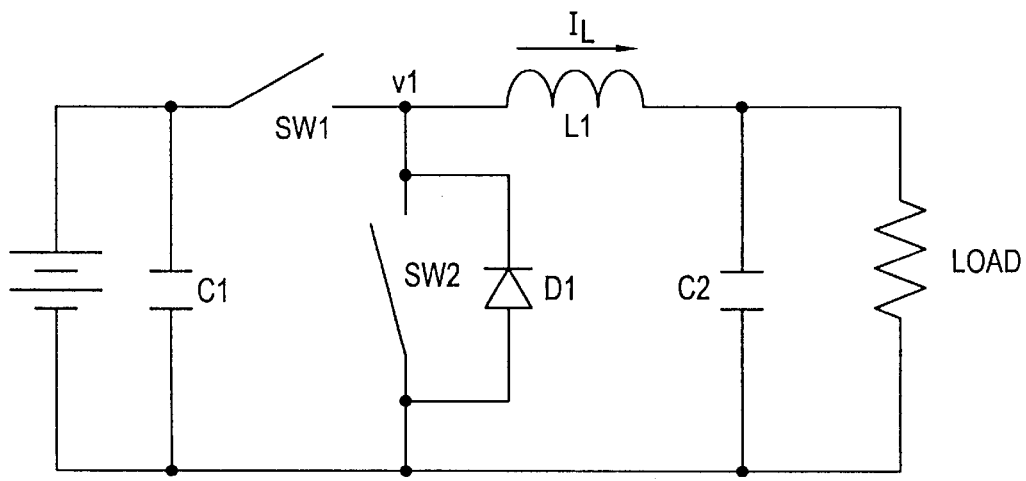
FIG. 1 is a schematic diagram of a switch mode power converter circuit in accordance with the buck topology.

The basic elements of a switch mode power converter include power switch devices, inductors and capacitors for energy storage and filtering, and a feedback/control circuit to modulate the switch timing to regulate the output voltage. Several different topologies of switch mode power converters can be created by connecting these elements in different configurations. A block diagram of the buck topology, commonly referred to as a buck converter, is shown in FIG. 1. This topology is typically used in battery-powered applications to convert the battery voltage to a regulated output voltage at a lower value.

Figure 1A:
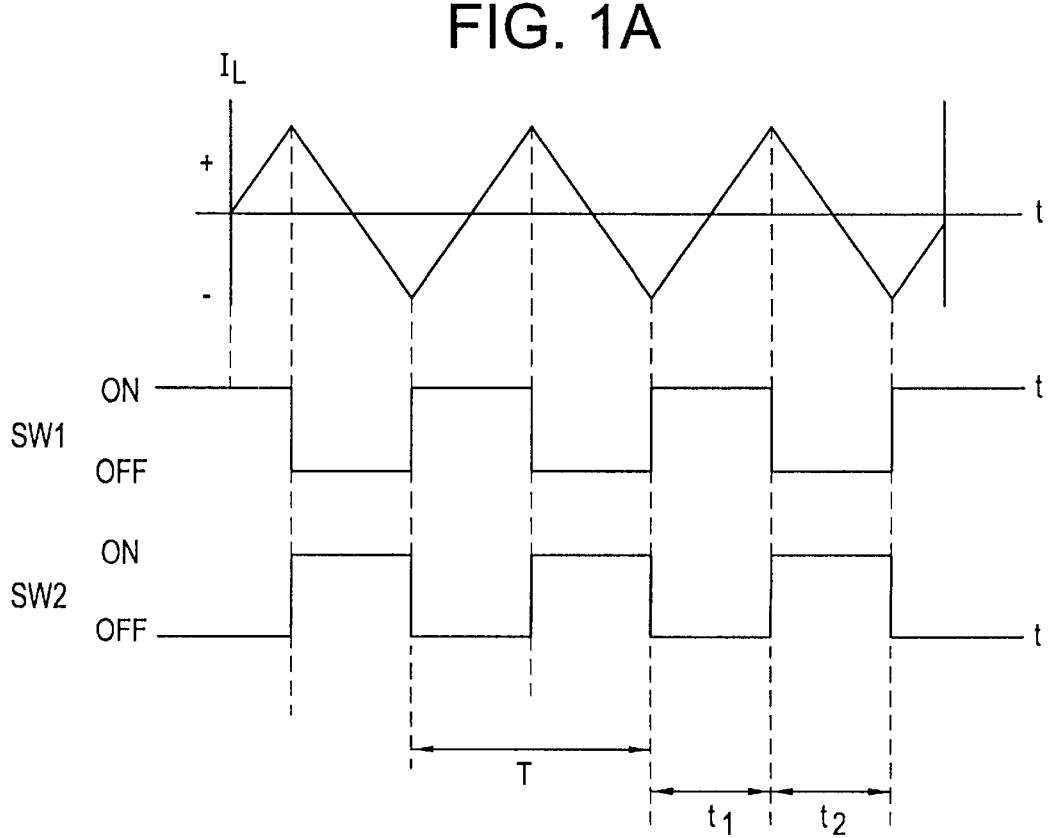
FIG. 1A is an inductor current waveform diagram for a buck converter operating in continuous mode.
Figure 1B:
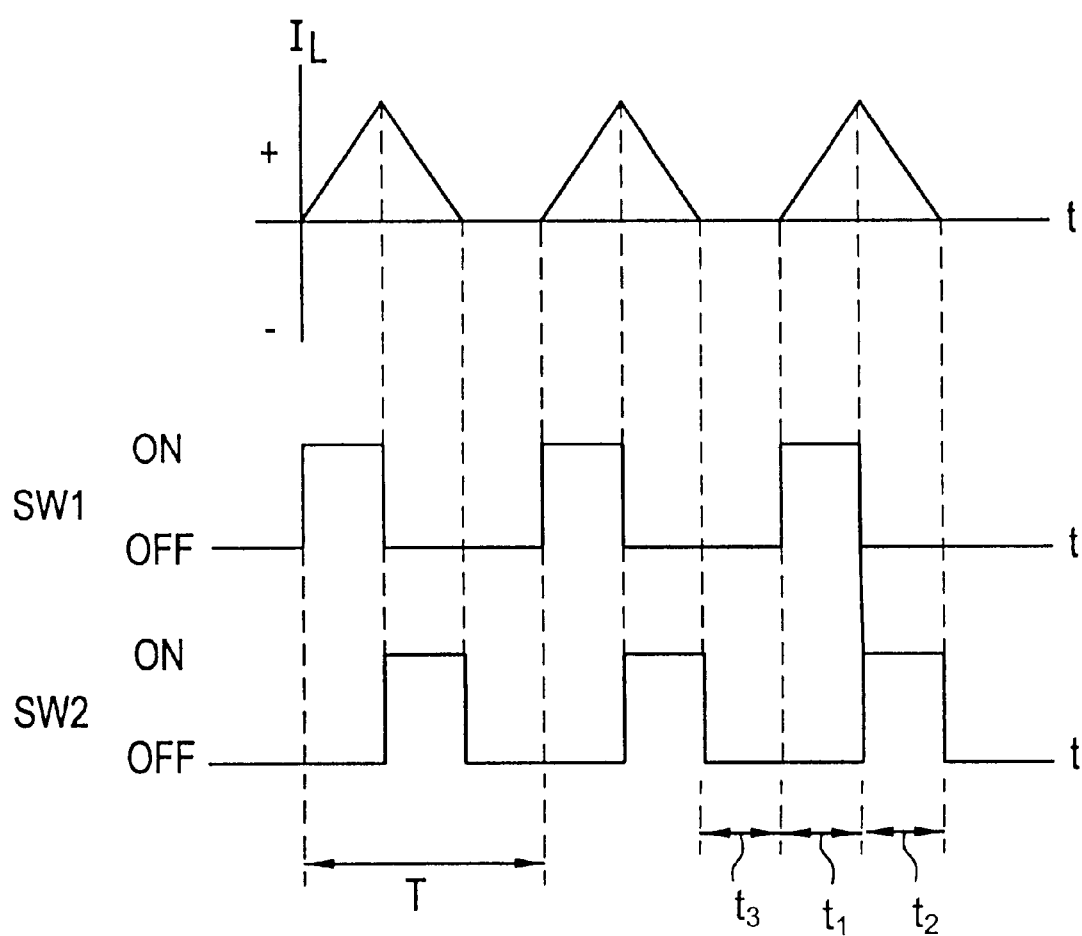
FIG. 1B is an inductor current waveform diagram for a buck converter operating in discontinuous mode.

A buck converter can be operated in "continuous" or "discontinuous" mode, as defined by the characteristics of the inductor current waveform. For example, referring now to FIG. 1A, in continuous mode inductor current $I_L$ is always present and flowing through the inductor. If current is flowing in the inductor when SW1 turns on, the converter is operating in continuous mode. In contrast, referring now to FIG. 1B, in discontinuous mode the inductor current $I_L$ must drop to zero during each switch cycle; during the time $I_L=0$, the load current is supplied by capacitor C2. In discontinuous mode, no current is flowing through the inductor when SW1 turns on. Buck converters are typically operated in continuous mode, as this reduces the peak currents in the switches and other circuit elements and reduces the input and output filter requirements.

Referring now to FIG. 1, when in continuous mode the power switches SW1 and SW2 are used to generate a square-wave voltage waveform at node v1. This AC signal is filtered by inductor L1 and capacitor C2 to produce a DC output voltage. The value of the output voltage is determined by the input voltage and the "duty cycle", which is a measurement of the ratio of the time duration in which the switch is "on" (t1) compared to the time duration of the entire switch cycle (T).

Figure 2:
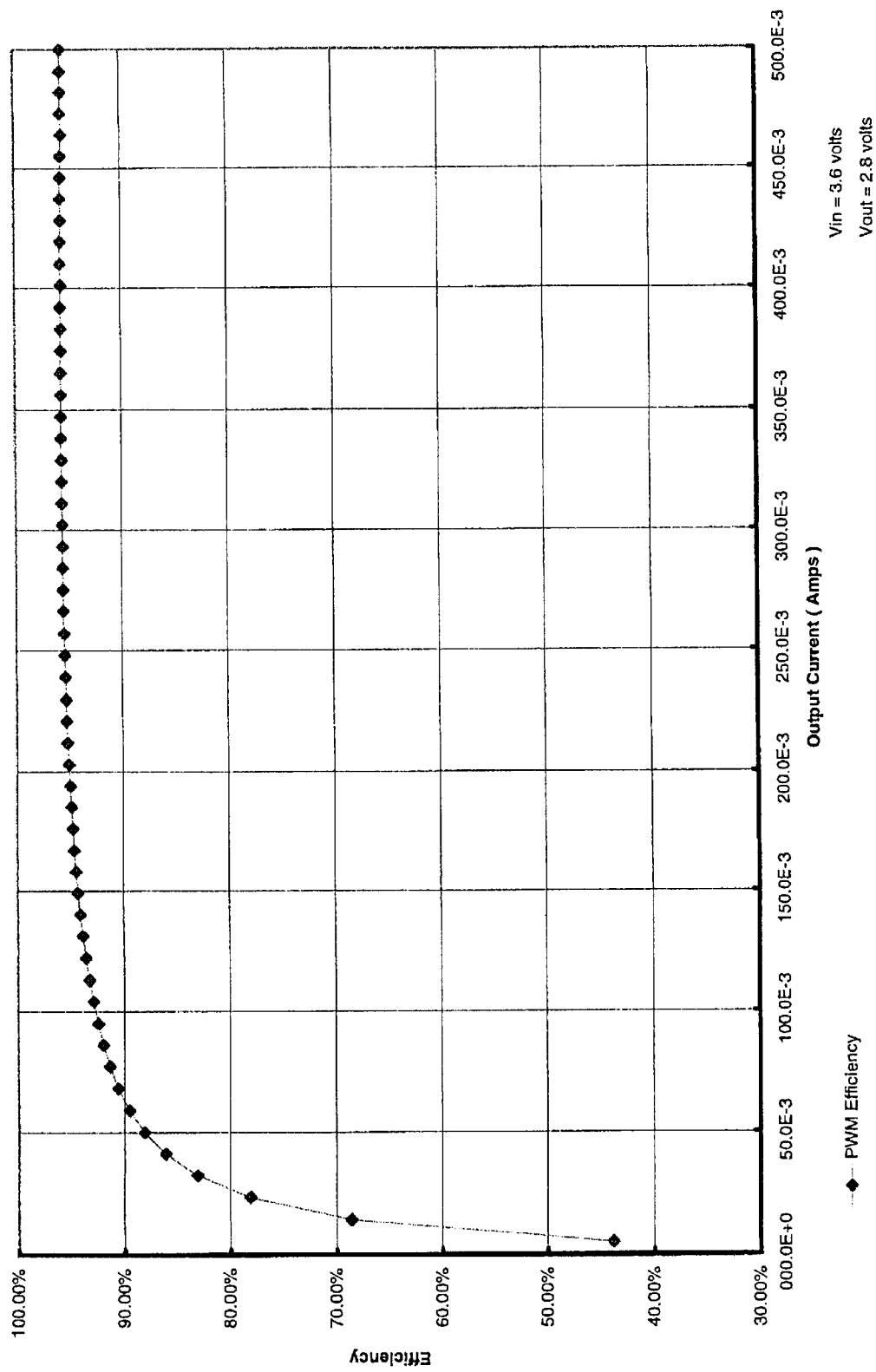
FIG. 2 is typical power efficiency curve for a buck converter.

The efficiency of a power converter is defined as the ratio of the output power to the input power, and is expressed as a percentage, with 100% being the maximum efficiency that would be achieved by an ideal converter with no losses. A typical efficiency curve for the buck converter discussed above is shown in FIG. 2.

Figure 3:
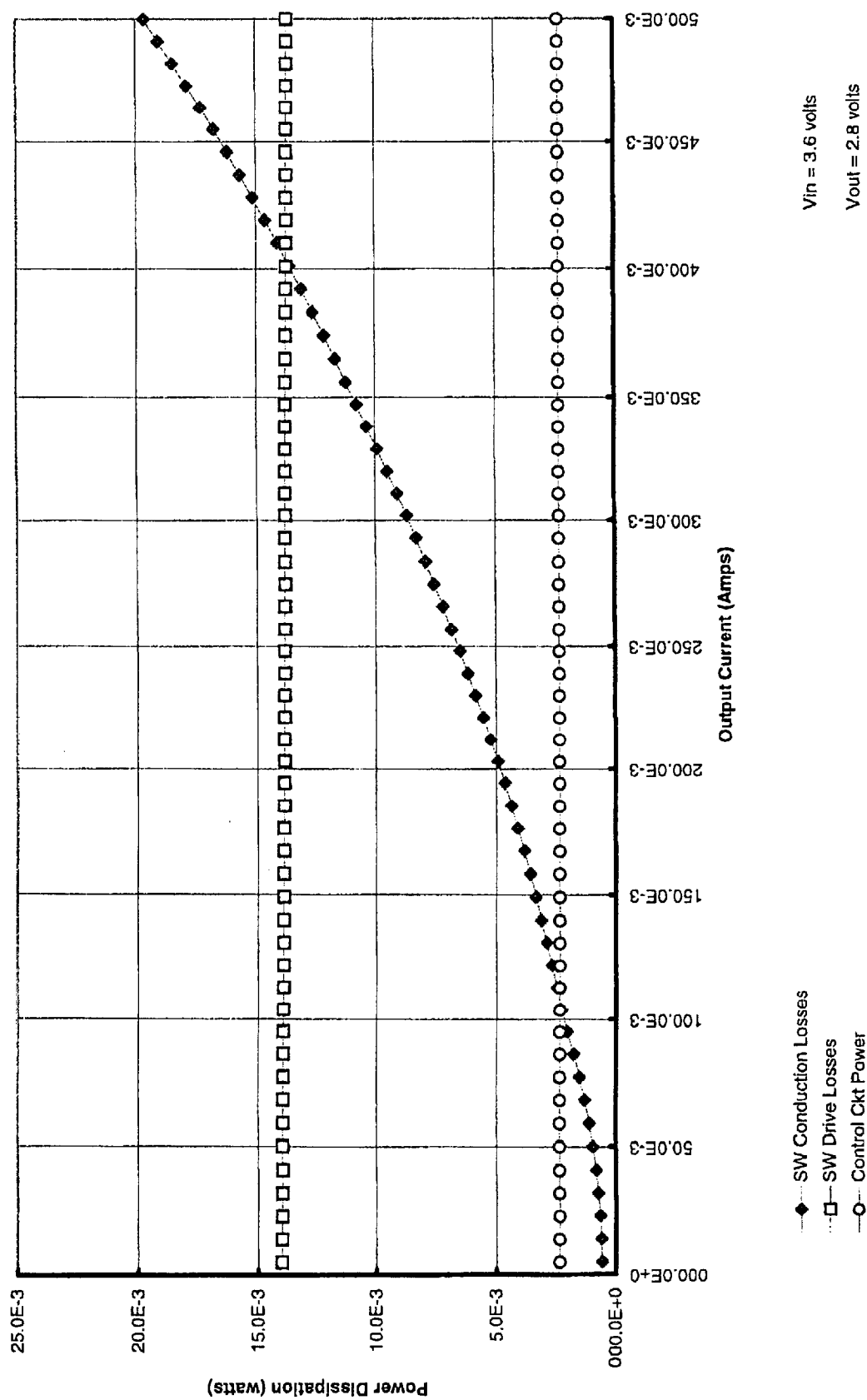
FIG. 3 is an illustration of three categories of power losses for a power converter.

The power losses in a practical converter fall into three categories: DC conduction losses due to current flowing through the finite resistances of the power switches and interconnects; switching losses due to the energy used to charge the parasitic capacitances of the power switches and other nodes in the circuit; and quiescent losses due to the supply currents needed to operate the control circuit. Each of these categories of losses are shown in FIG. 3 for the same power converter, assuming fixed frequency operation at given input and output voltages.

DC conduction losses are a function of switch size and output (load) current. As FIG. 3 shows, these DC conduction losses dominate at high output currents. Increasing the size of the switches would decrease their parasitic resistance and increase their parasitic capacitance. This would decrease the switching losses and improve efficiency under these conditions, at the cost of reduced efficiency at low output currents.

Switching losses are a function of switch size, input voltage, and switching frequency. As FIG. 3 shows ("SW Drive Losses"), these switching losses dominate at low output currents. As a result, a converter optimized for maximum efficiency at maximum load provides poor efficiency at low output currents. This effect is more significant for converters that operate at relatively higher switching frequencies in order to achieve reduced size of external components and improved transient response. A Metal Oxide Semiconductor Field Effect Transistor (MOSFET), in particular, has size dependent parasitic capacitances between the gate, drain, source, and substrate of the device. A converter using typically-sized MOSFETs for switching devices can require a current draw of about 4 milliAmps when operated at a frequency of 2 MHz, due to the energy required to charge parasitic capacitances during each switching cycle. This power loss can have a drastic effect on standby time; for portable electronic devices, switching losses can cut standby mode battery life in half.

Quiescent losses are a function of input voltage, as the bias currents in analog circuits are typically independent of operating conditions. As can be seen in FIG. 3 ("Control Ckt Power"), if switching losses are reduced to a sufficiently low level, quiescent losses would become the limiting factor to efficient operation at low output currents. Thus, it is advantageous to provide a control circuit that consumes relatively less power in operation.

Portable battery powered electronic equipment, such as, for example, handheld wireless terminals, spend a significant amount of time in a standby mode of operation in which the power requirements are minimized. Maximizing the battery life under these conditions requires a power converter that can operate at high levels of efficiency at low output currents, as well as at high output currents which will be seen, for example, when the equipment is actively transmitting. In standby mode of operation, the load current requirement can be 5 milliAmps or less. If a control circuit requires between 600 and 800 microAmps, as is typical for many existing control circuits, then the control circuit itself contributes significantly to source power consumption.

The efficiency of a converter can be increased at low output currents by implementing a mode of operation in which the converter operates in discontinuous mode at a reduced switching frequency, with a reduction in control circuit power.

The present invention provides for the regulation of the output voltage of a switching power converter operating in discontinuous mode by modulating the peak inductor current. It is applicable to any power converter topology, but is described herein in an exemplary embodiment using buck topology (reference FIG. 1).

Applicants fully incorporate herein the specification of an additional application relating to power converters filed by Cadence Design Systems on the same date as the filing of the present application: application Ser. No. 09/513,339 entitled "POWER CONVERTER MODE TRANSITIONING METHOD AND APPARATUS."

In general, the output voltage of a converter such as that shown in FIG. 1 can be regulated by either: 1) Controlling the amplitude of the inductor current $I_L$, or 2) controlling the pulse repetition frequency of the $I_L$ waveform.

Figure 3A:
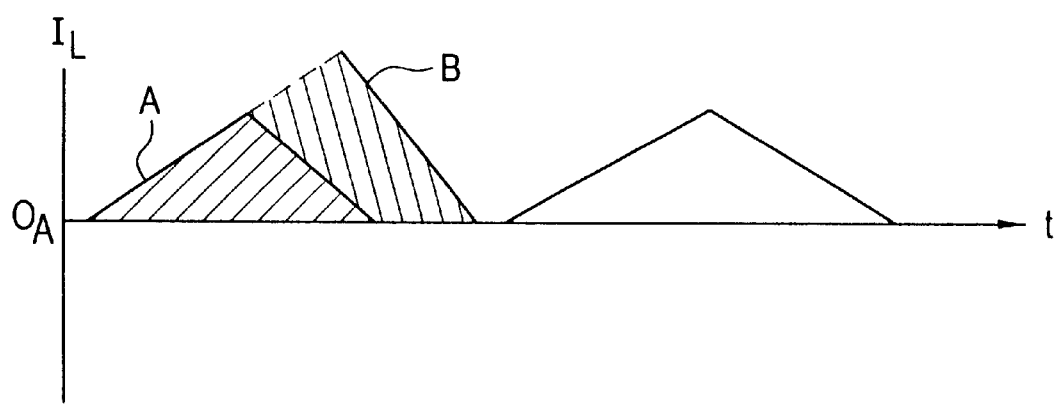
FIG. 3A shows how controlling the amplitude of the inductor current with respect to time can be used to regulate the output voltage of a power converter.

An example of the first situation is shown in FIG. 3A. Referring now to FIG. 3A, the area under the inductor current waveform "$I_L$" represents the amount of energy transferred to the output during each current pulse. The area under waveform B is greater than the area under waveform A, because the amplitude and duration of waveform B is greater than that for waveform A. This indicates that a converter operating according to waveform B is transferring correspondingly more power to the load relative to waveform A.

Figure 3B:
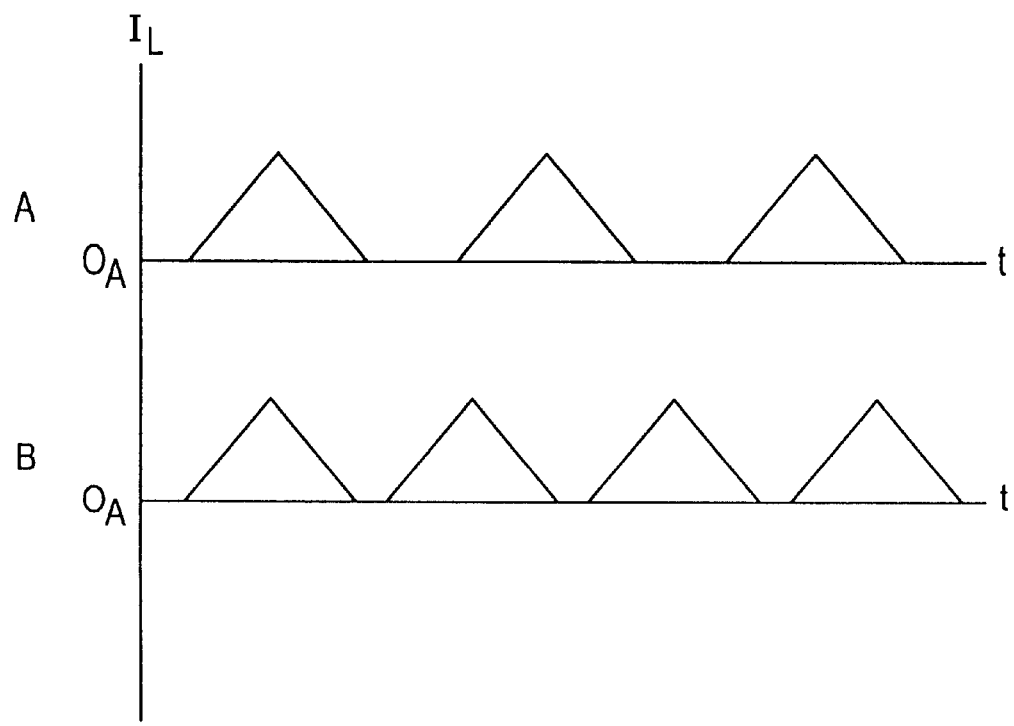
FIG. 3B shows how controlling the frequency of the inductor current waveform with respect to time can be used to regulate the output voltage of a power converter.

The second situation is shown in FIG. 3B. Referring now to FIG. 3B, the area under waveform B is greater than the area under waveform A, because waveform B is operating at higher frequency relative to waveform A. Again, this indicates that a converter operating according to waveform B is transferring correspondingly more power to the load relative to waveform A.

Other approaches to providing such a low-power operational mode which reduces the switching frequency and improves the efficiency at low output currents, by operating the converter in discontinuous mode, can be characterized into two general groups based on the parameters they control.

The first such group, burst-mode converters, use the same control circuitry in both high power and low power modes. They reduce the switching frequency, thus the switching losses, by skipping switch cycles when the output current drops below a pre-defined level, or based on external command. These converters typically run at the normal clock rate for several cycles, while charging the output capacitor slightly above the desired voltage. The converter then skips the next several cycles, as the extra energy is pulled out of the output capacitor by the load. The resulting frequency spectrum contains a significant amount of energy over a wide frequency band, including frequencies associated with the normal switching frequency as well as the burst frequency. The burst frequency can drop into the audio range (i.e., below 20 KHz), where the switching action of the converter can generate noise which can interfere with audio frequency circuits in the equipment powered by the supply, and be audible to the end user. In addition, because a burst-mode converter uses the same high-bandwidth circuitry used in high power mode, it is not possible to achieve maximum efficiency improvements by drastically reducing the quiescent power.

Figure 3D:
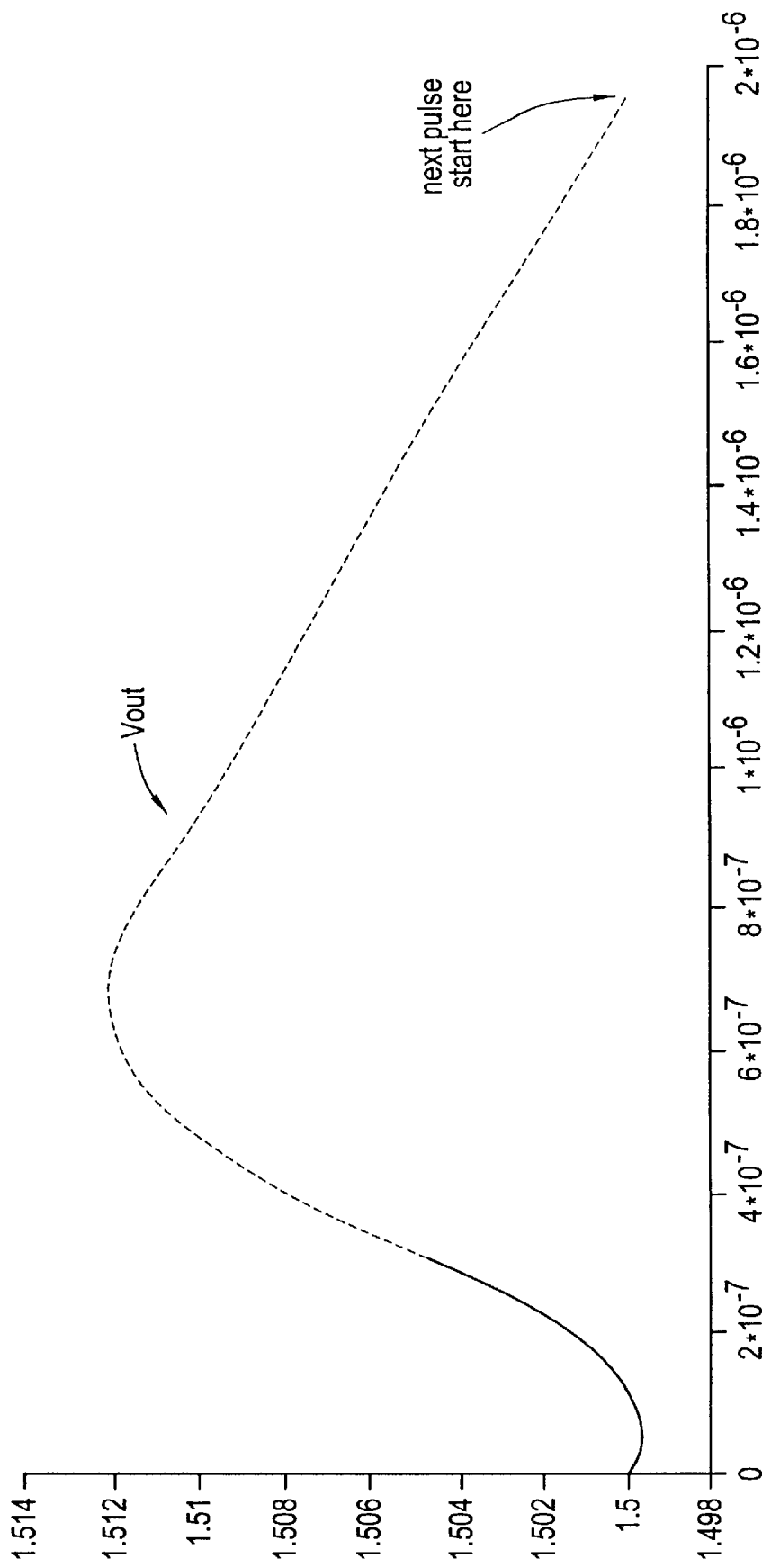
FIG. 3D shows an example of variation in output voltage over time for a single discontinuous-mode switching cycle.

A second group includes power converters that use a fixed peak current trip point to control the output voltage but achieve efficiency improvements by reducing the switching frequency. This group operates as shown in FIGS. 3C and 3D. The length of each switch cycle is determined by the amount of time required to charge the inductor current $I_L$ up to a pre-determined value. The energy provided to the load during this switch pulse charges up the output capacitor above the regulation set point ($V_{OUT}$ is the voltage dropped over the output capacitor), and the converter waits for the load to discharge the capacitor before initiating the next switch pulse.

In this group, the switching frequency is not regulated and can drop into the audible range and generate noise that can be picked up by the audio frequency circuits and heard by the end user. Further, a power converter operating at a switching frequency of 2 MHz typically has an open loop gain crossover frequency of about 100 KHz, which requires high bandwidth components in the feedback path; such high bandwidth components require relatively more power. A converter according to the present invention preferably switches at about 50 KHz, allowing the use of lower bandwidth, lower power components in the feedback path.

In addition, because the peak current (i.e., regulation set point) is static and fixed, the output ripple voltage increases significantly at low output currents. This effect is increased by the ratio of the maximum to minimum output currents supported by the design, because the peak current must be set higher to support the higher output current requirement.

Further, in the buck topology when the ratio of input voltage to output voltage becomes small, the voltage dropped across the parasitic resistances of switch SW1 and inductor L1 becomes significant compared to the differential voltage between the input and output (which is the voltage applied across the inductor when SW1 is "on"). When this occurs, the current in inductor L1 is no longer linear, because the slew rate decreases as the current increases. This inductor current slew rate reduction increases the amount of time required for the inductor current to reach the programmed value, causing excess energy to be transferred to output capacitor C2. To compensate, the controller must significantly decrease the Pulse Repetition Frequency (PRF). The output voltage ripple under these conditions will be significantly increased. In extreme cases, the inductor current may not be able to reach the programmed level at all, but will flatten out at a lower level. In a buck converter, the input is shorted to the output during this condition, causing the output voltage to increase to approximately the input voltage. This could be several hundred millivolts above the desired output voltage.

Figure 4:
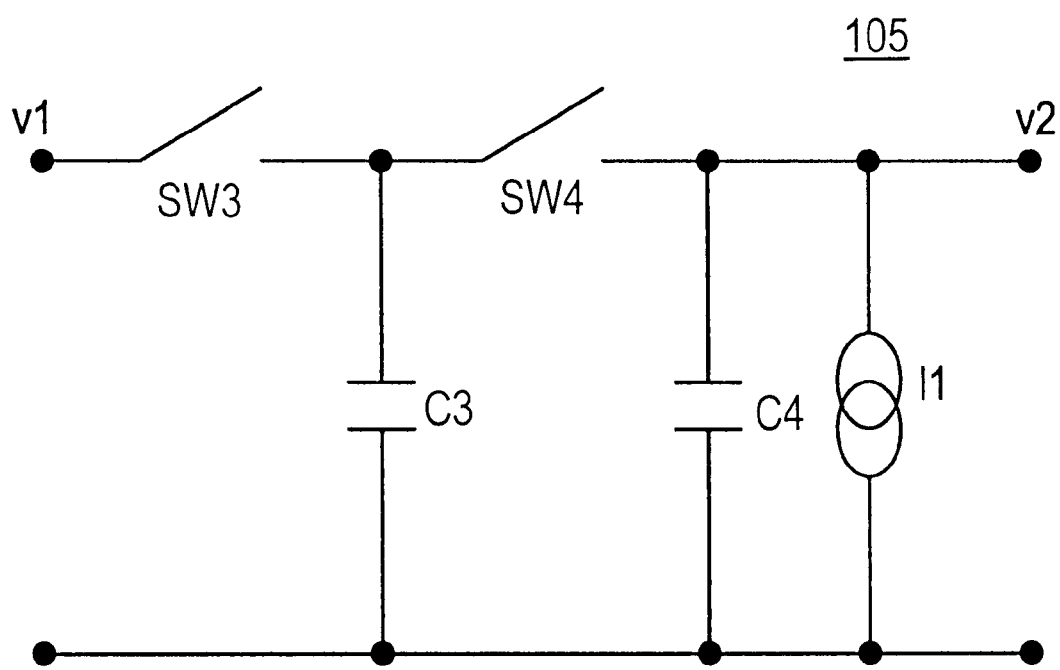
FIG. 4 is a schematic circuit diagram of a preferred embodiment of a control voltage generator of a converter according to the present invention.

FIG. 4 provides a schematic circuit diagram of a preferred embodiment of a control voltage generator 105 of a converter 100 according to the present invention. Referring now to FIG. 4, the control law is based on the characteristic operation of control voltage generator 105, which generates an output voltage v2 as a function of the switching frequency of the CLK signal, which is used to control SW1 and SW2. This voltage is then used to control the peak current in the inductor L1 (reference FIG. 1), which is controlled by the switch timing of switches SW1 and SW2 (reference FIG. 1). By clocking control voltage generator 105 once per discontinuous switch cycle, a voltage is generated which is a function of the switching frequency of converter 100. In a preferred embodiment, C3<<C4.

Figure 5A:
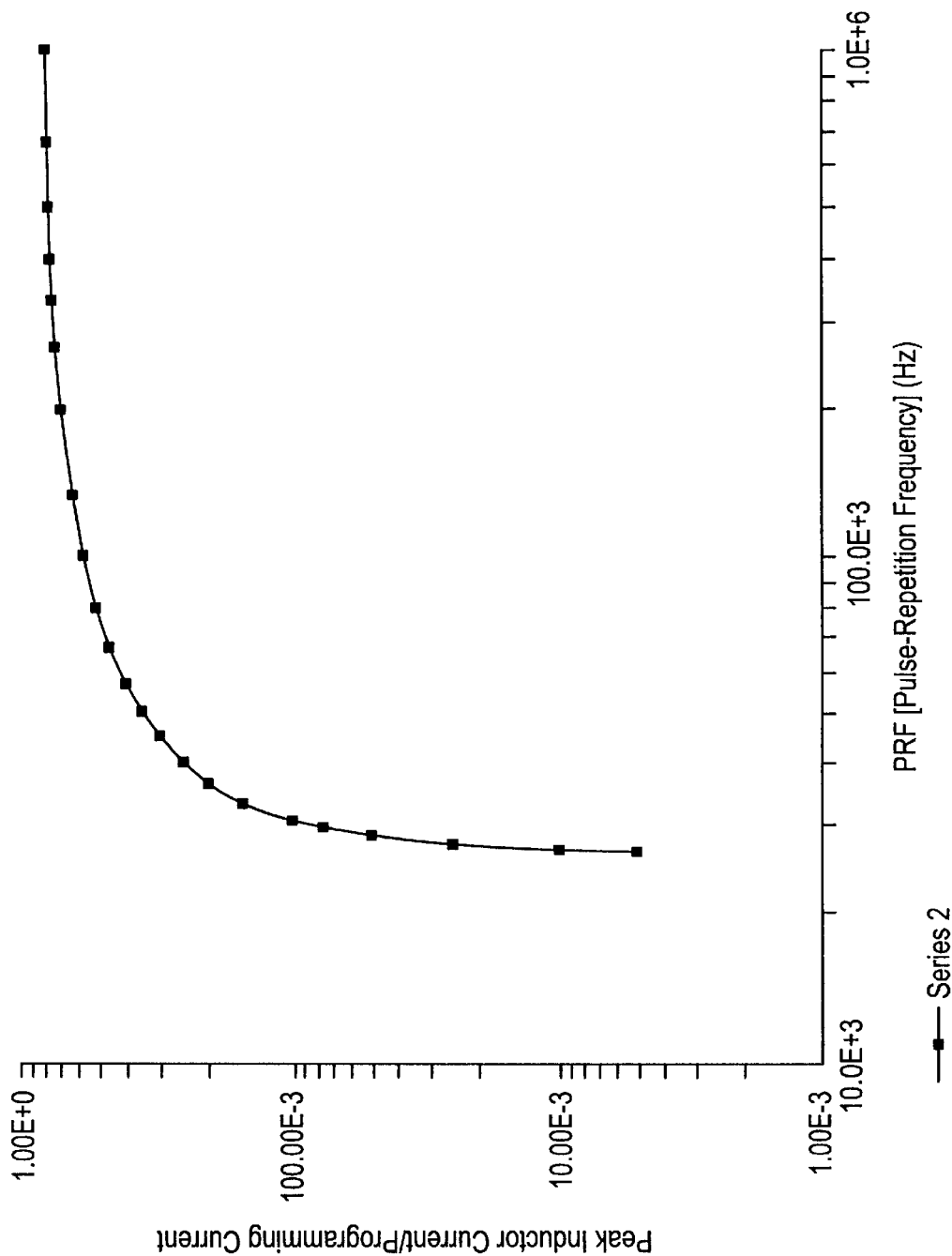
FIG. 5A is a plot of a curve relating switching frequency, or Pulse Repetition Frequency (PRF), to desired peak inductor current, based on the characteristics of the control voltage generator.

Detailed operation of control voltage generator 105 is described as follows. Referring again to FIG. 4, switch SW3 is closed during the time between each switch cycle (i.e., time "t3" in FIG. 1B). During this time, capacitor C3 charges to voltage v1. At each switch cycle, switch SW3 opens and switch SW4 closes, shorting capacitors C3 and C4 together and redistributing the charge between them. Specifically, switch SW3 opens and switch SW4 closes during t2 in FIG. 1B. A non-overlapping clock generator, driven by converter 100 switch control signals, prevents both switches from being on at the same time. After this charge redistribution, the voltage on C4 is raised to v2. The amount of the voltage increase is dependent on the initial voltage difference between v1 and v2, and the ratio between the capacitor values of C3 and C4. The energy in capacitor C4 is drained off continuously by current source I1, causing the voltage on capacitor C4 to be reduced linearly over time. A steady-state condition exists when the amount of energy that is added to capacitor C4 at each switch cycle times the switching frequency equals the rate at which energy is extracted from capacitor C4 by current source I1. This condition is determined by Equation 1 and plotted in FIGS. 5A and 6.

$$\frac{I_1}{C_4} \cdot \frac{1 + \frac{C_2}{C_3}}{v_1 - v_2} = \text{Pulse Repitition Frequency (PRF)} \qquad \text{Equation 1}$$

Figure 8:
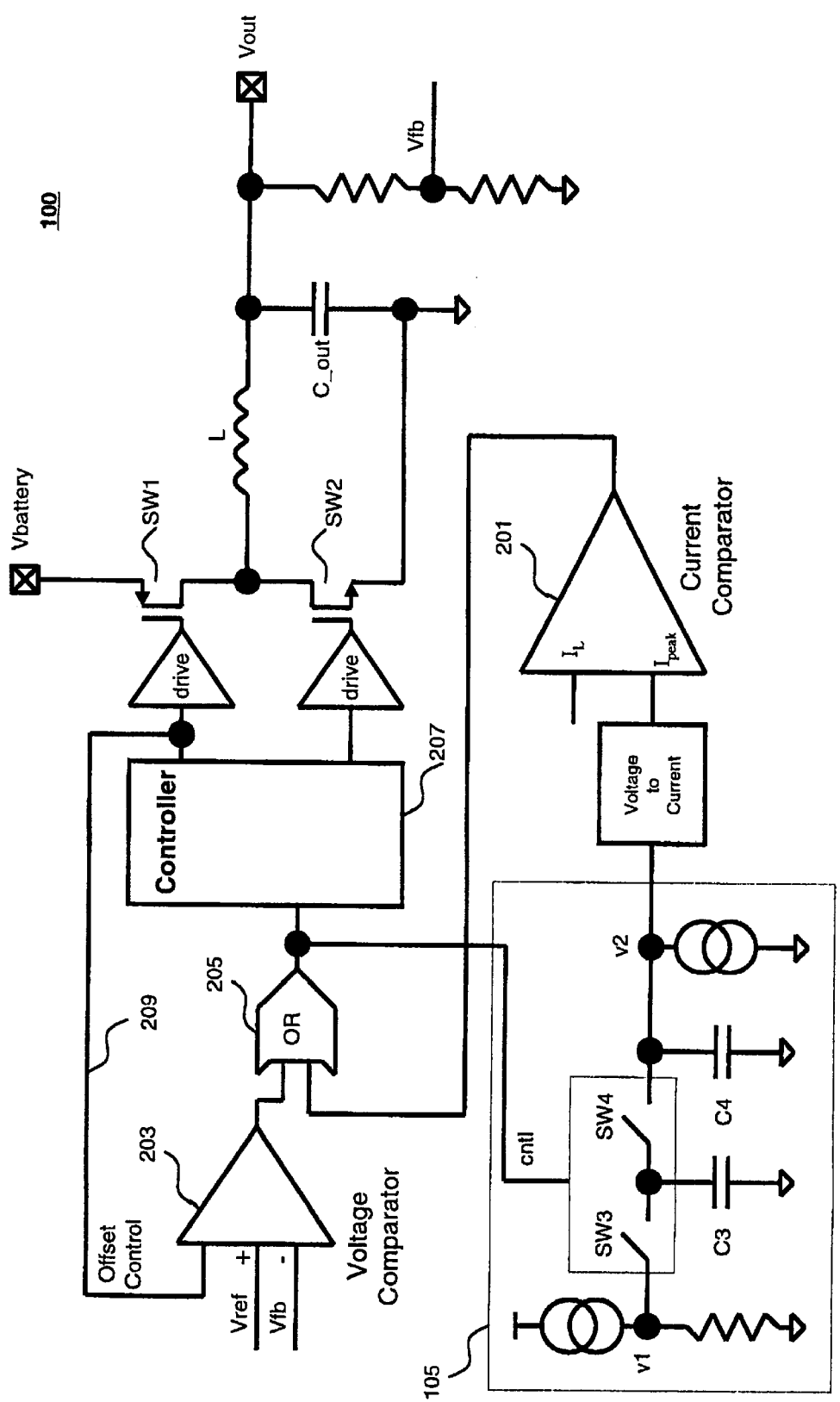
FIG. 8 is a schematic circuit diagram of a preferred embodiment of a converter according to the present invention, showing regulation of the converter output voltage achieved by monitoring both output voltage and inductor current conditions.

In a preferred embodiment, the voltage on capacitor C4 is converted to a current, $I_{PEAK}$, by, for example, applying the voltage on capacitor C4 to a unity gain buffer amplifier, and coupling the output of the buffer to ground through a series resistance to produce a current. The converted current, $I_{PEAK}$, can then be used to control the peak current in the inductor L as shown in FIG. 8. The control function could also be implemented by converting the inductor current to a voltage by, for example, passing the current through a series resistor and sensing the voltage across the resistor. The inductor current could then be controlled by comparing this voltage to voltage v2.

FIG. 8 provides a schematic circuit diagram of a preferred embodiment of converter 100 according to the present invention. Referring now to FIG. 8, current comparator 201 measures the difference between $I_{PEAK}$ and inductor current $I_L$. When $I_L$ exceeds $I_{PEAK}$, comparator 201 outputs a signal to controller 207 to open switch SW1 and close switch SW2. This causes the current in the inductor to begin decreasing. When the inductor current crosses through zero amps, SW2 is opened to prevent the reverse flow of current from the output capacitor $C_{OUT}$.

Figure 5B:
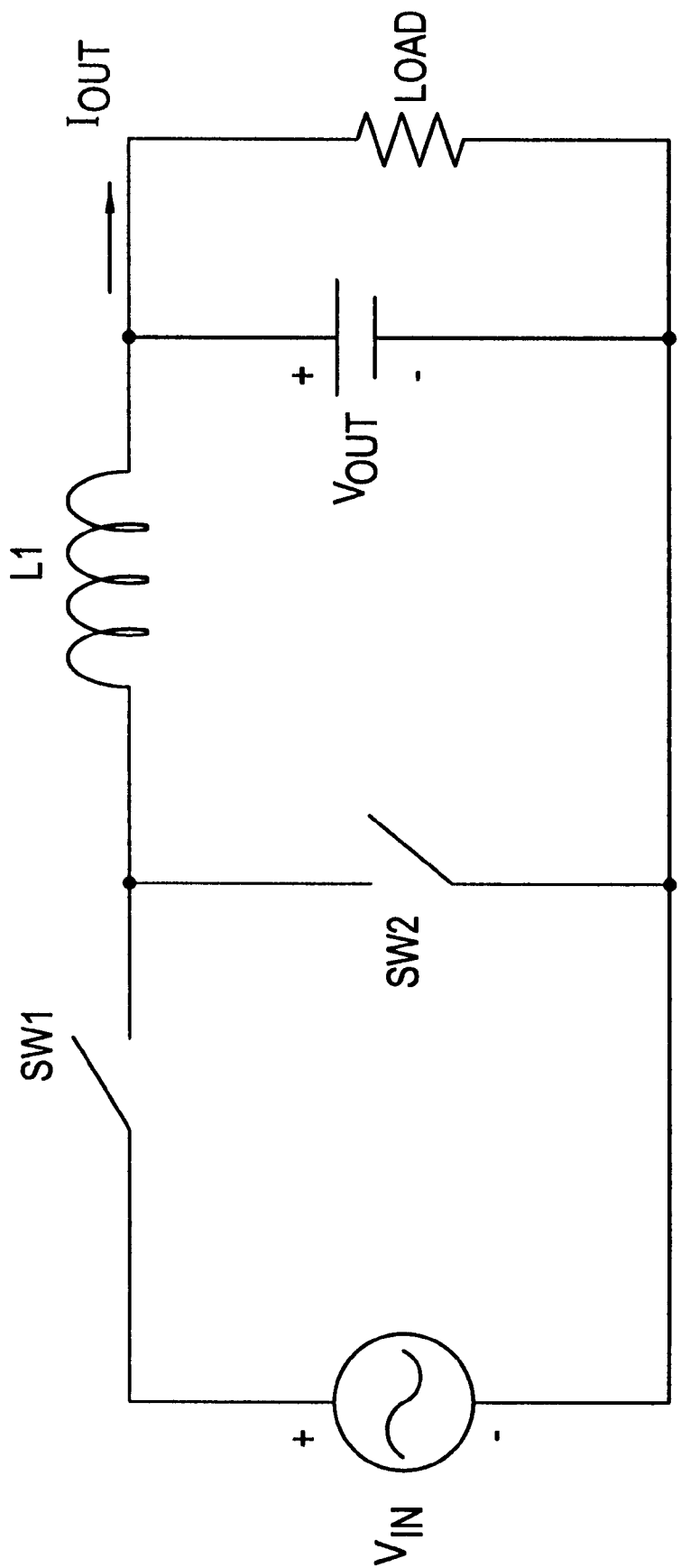
FIG. 5B is a schematic diagram of an equivalent circuit for a buck converter whose operating characteristics may be described in a series of plotted curves.

For an ideal buck topology converter operating in discontinuous mode, the relationship between peak inductor current and switching frequency is described by the following Equation 2 in reference to the equivalent circuit shown in FIG. 5B.

$$\frac{2 \cdot I_{out}}{t_{PULSE} \cdot I_{PEAK}} = PRF \qquad \text{Equation 2}$$

$$\text{where } t_{PULSE} = I_{PEAK} \cdot \frac{L_1}{V_{IN} - V_{OUT}} + I_{PEAK} \cdot \frac{L_1}{V_{OUT}}$$

Figure 6:
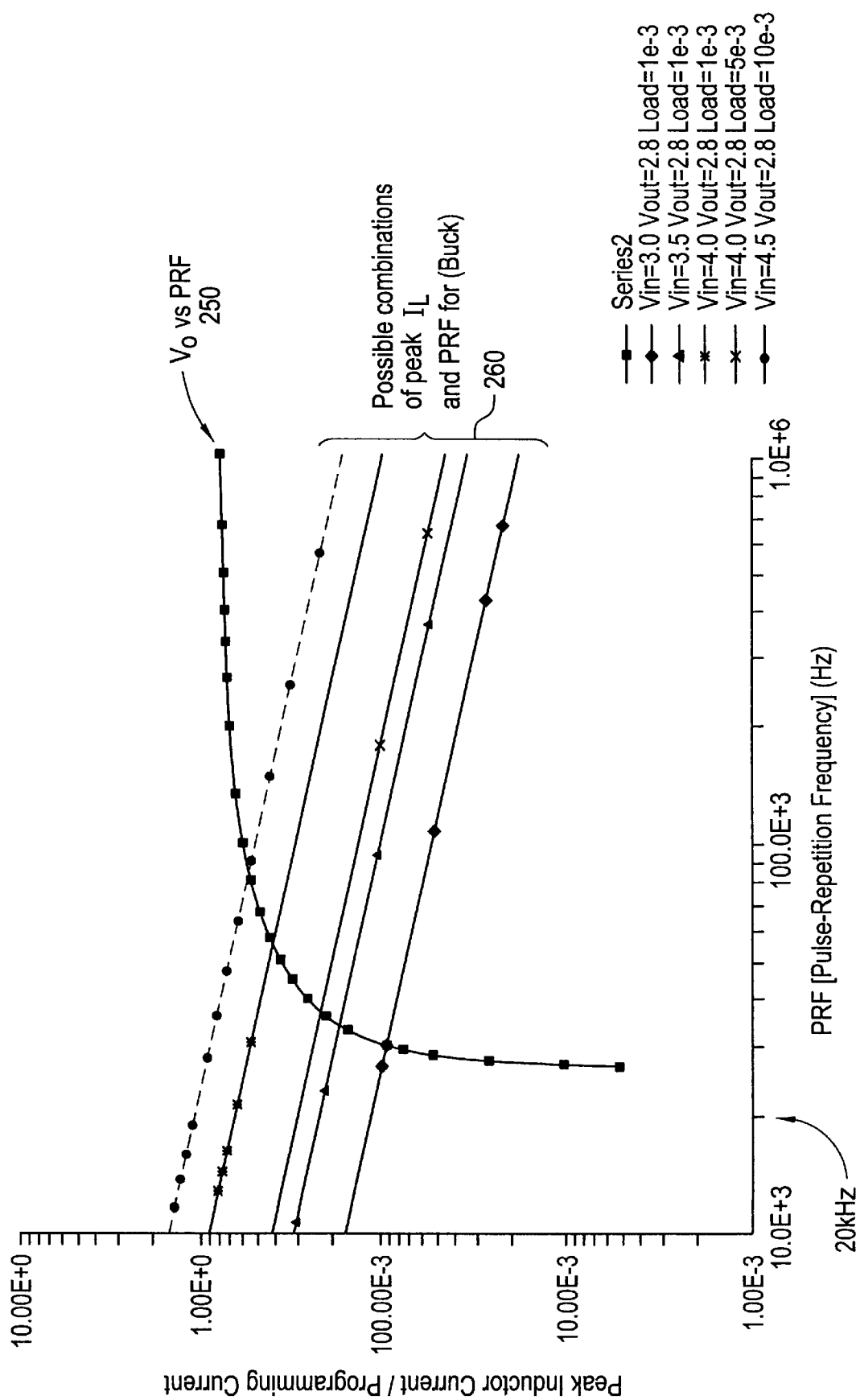
FIG. 6 is a graph showing a control law curve intersecting with a series of possible combinations of peak inductor current and PRF for a preferred embodiment of a converter according to the present invention.

A series of curves for various line and load conditions are plotted in FIG. 6, and compared to the characteristic equation for control voltage generator 105 of converter 100 as shown in FIG. 4. Assuming a control voltage to inductor current conversion ratio of 1:1, the operation of converter 100 is described by the intersection of the control law curve 250 with a plurality of power converter characteristic curves 260. Comparator 201 functions to maintain converter 100 operation in accordance with the conditions defined by the intersections of the characteristic curves 260 with control law curve 250. Converter 100 can adjust for variations in component values, such as, but not limited to, changes in inductance, because comparator 201 forces converter 100 to adjust other parameters, such as PRF, in order to stay within the operating characteristics of control law curve 250.

Figure 8A:
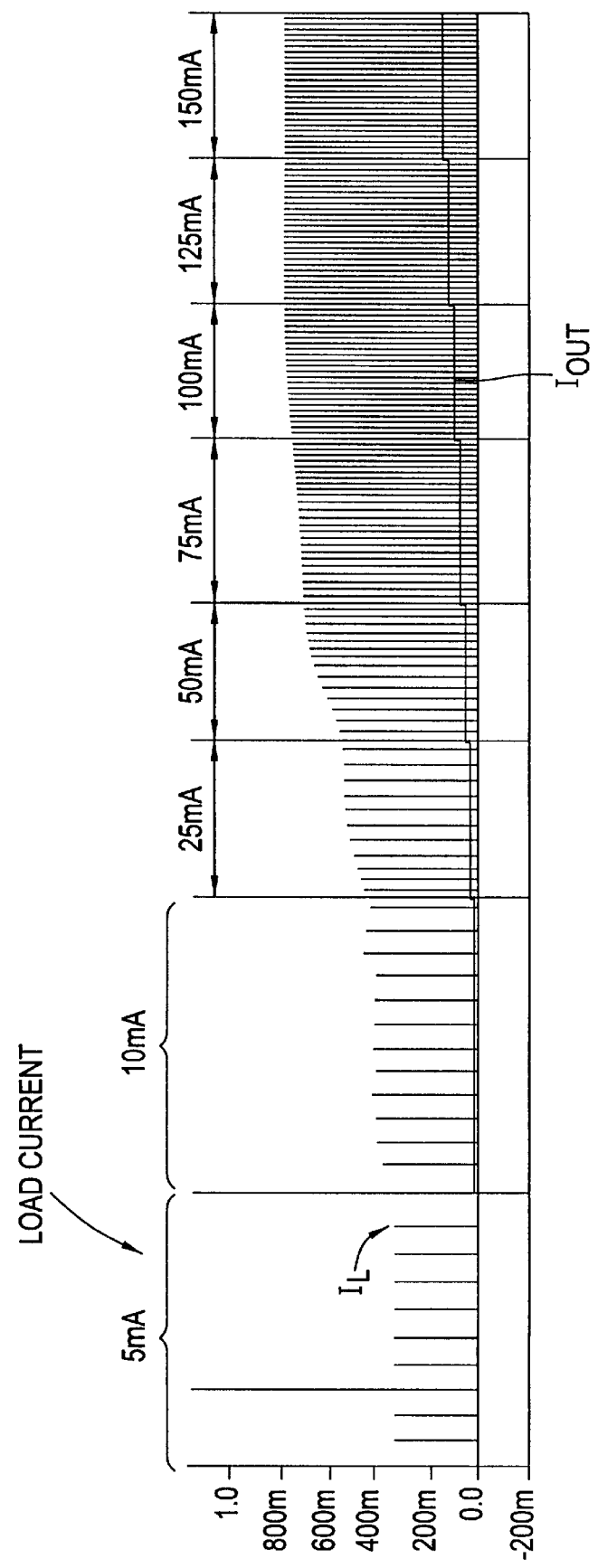
FIG. 8A is a graph of the inductor charging current pulse waveform characteristics for various load currents for a preferred embodiment of the present invention.
Figure 8B:
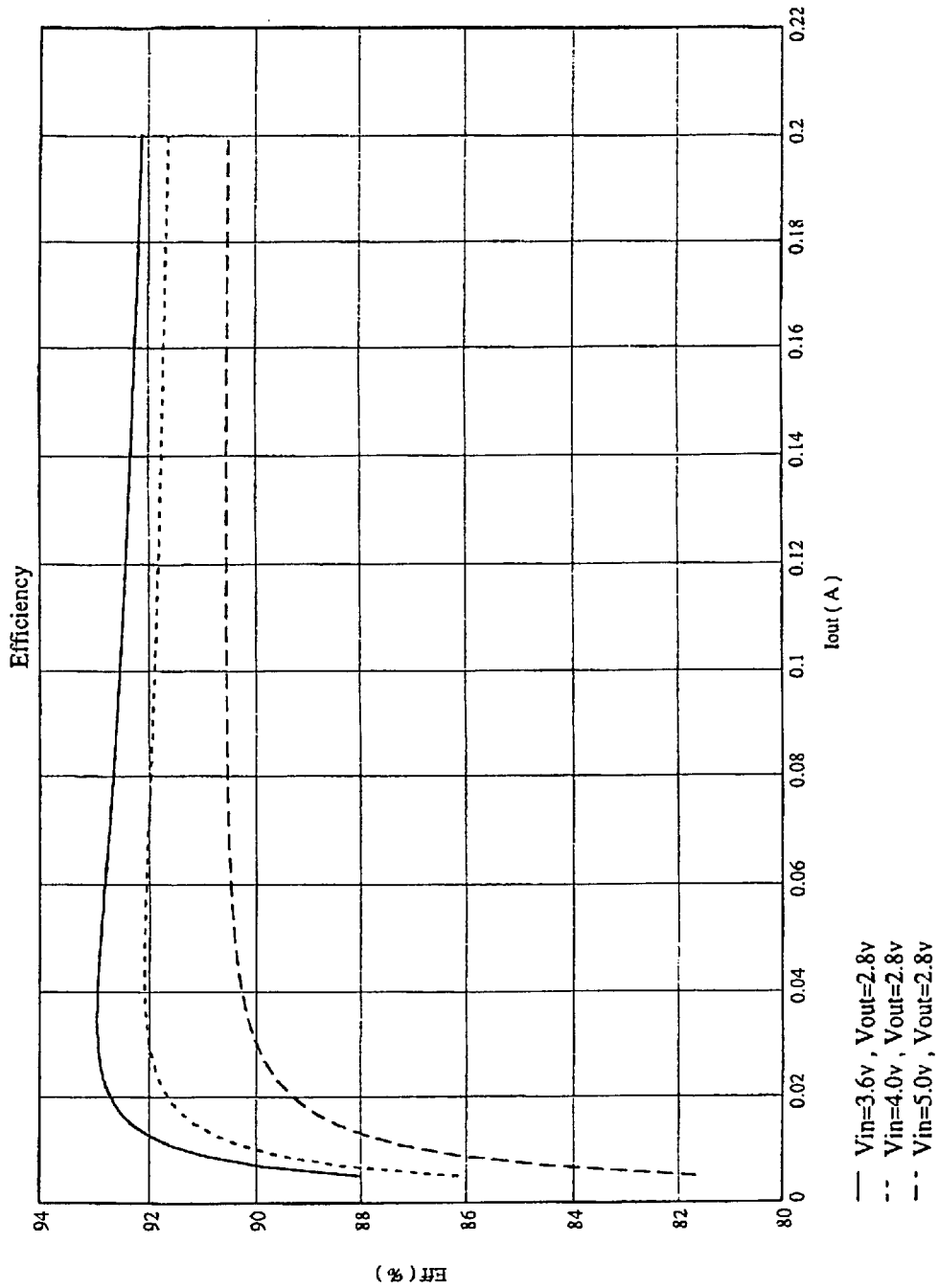
FIG. 8B shows the efficiency of a preferred embodiment of a converter according to the present invention is relatively constant over a wide range of output currents.
Figure 8C:
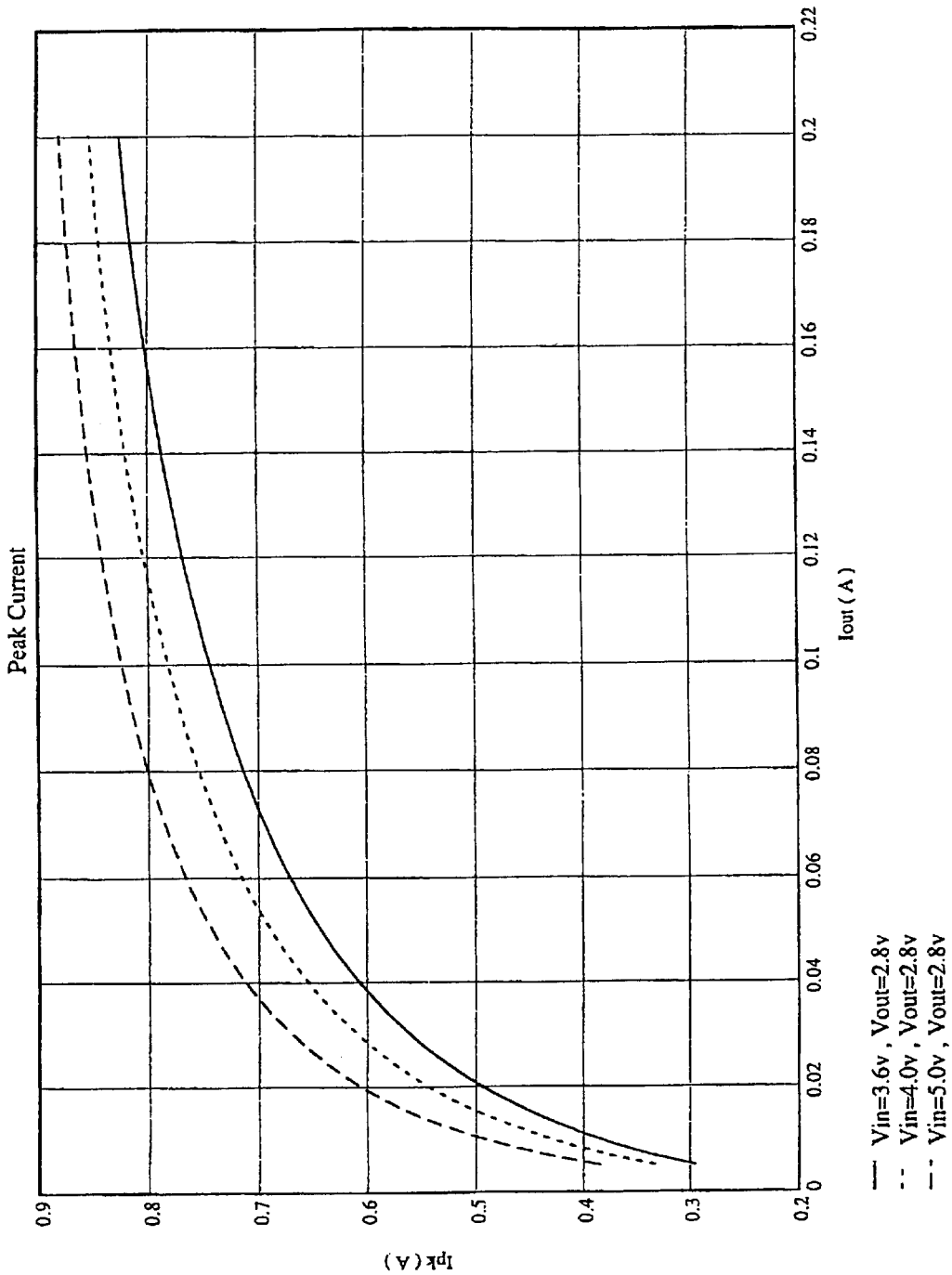
FIG. 8C shows peak inductor current being varied as output current changes for a preferred embodiment of a converter according to the present invention.
Figure 8D:
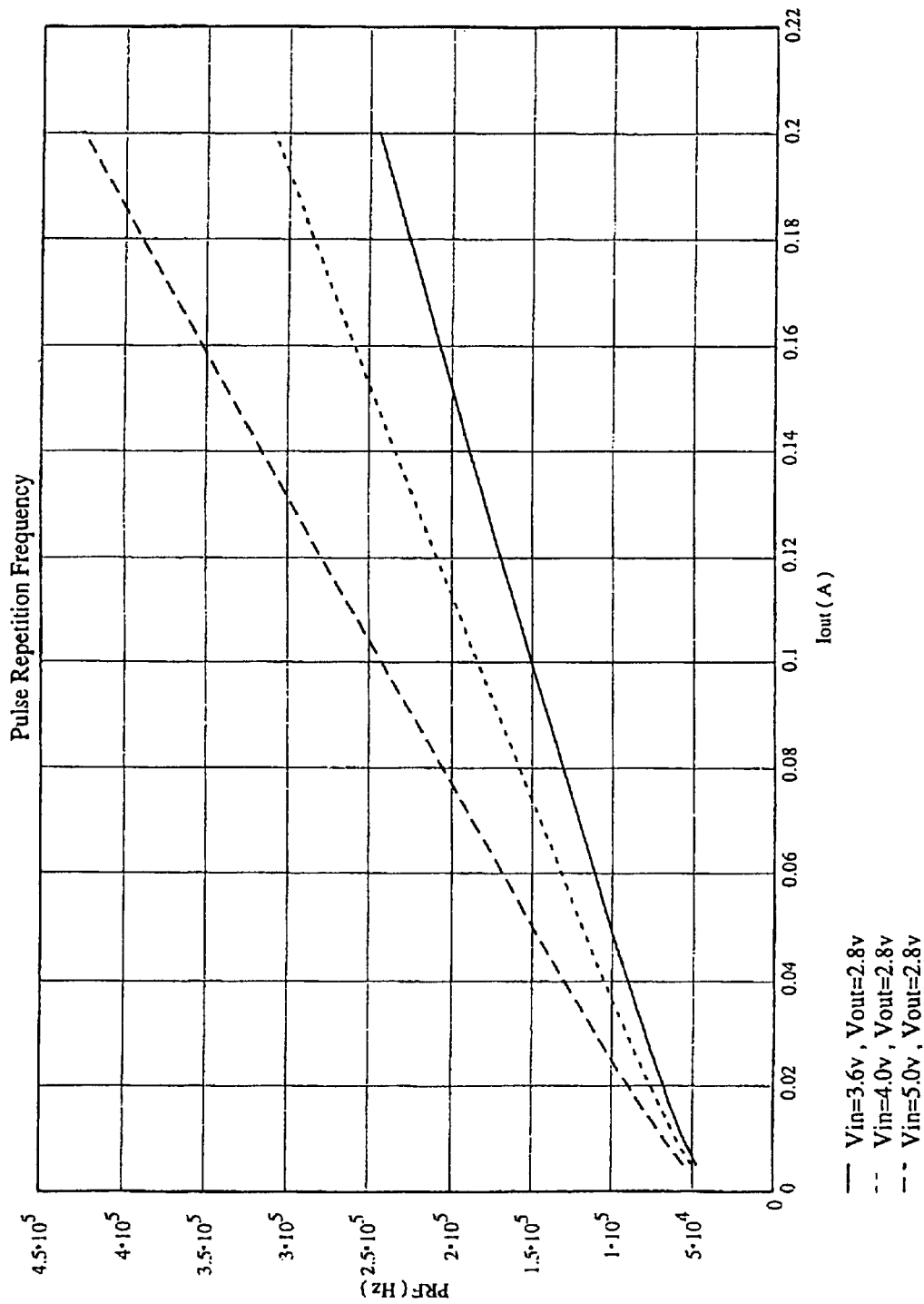
FIG. 8D shows PRF being varied as output current changes for a preferred embodiment of a converter according to the present invention.

As the output current increases, controller 100 will vary both the peak inductor current and PRF to regulate the output voltage to the desired value. FIG. 8A shows the waveform characteristics of the inductor charging current pulse for various load currents converter 100 according to the present invention. For a given combination of input and output voltages the peak inductor current and PRF follows the curves plotted in FIG. 8C and FIG. 8D. Because both peak current and PRF are varied, controller 100 can be designed so that the efficiency of the overall converter is relatively constant over a wide range of output currents. This is shown in FIG. 8B. Even at output currents as low as 5 milliAmperes, overall converter 100 operates at a significantly higher efficiency than a converter running in normal PWM mode.

Referring again to FIG. 6, at higher pulse repetition frequencies greater than 100 KHz, control law curve 250 provides a current limiting function, thereby avoiding the need for additional current limiting circuitry for converter 100.

Further, in a preferred embodiment, control law curve 250 does not allow PRF to fall below 20 KHz.

Figure 7:
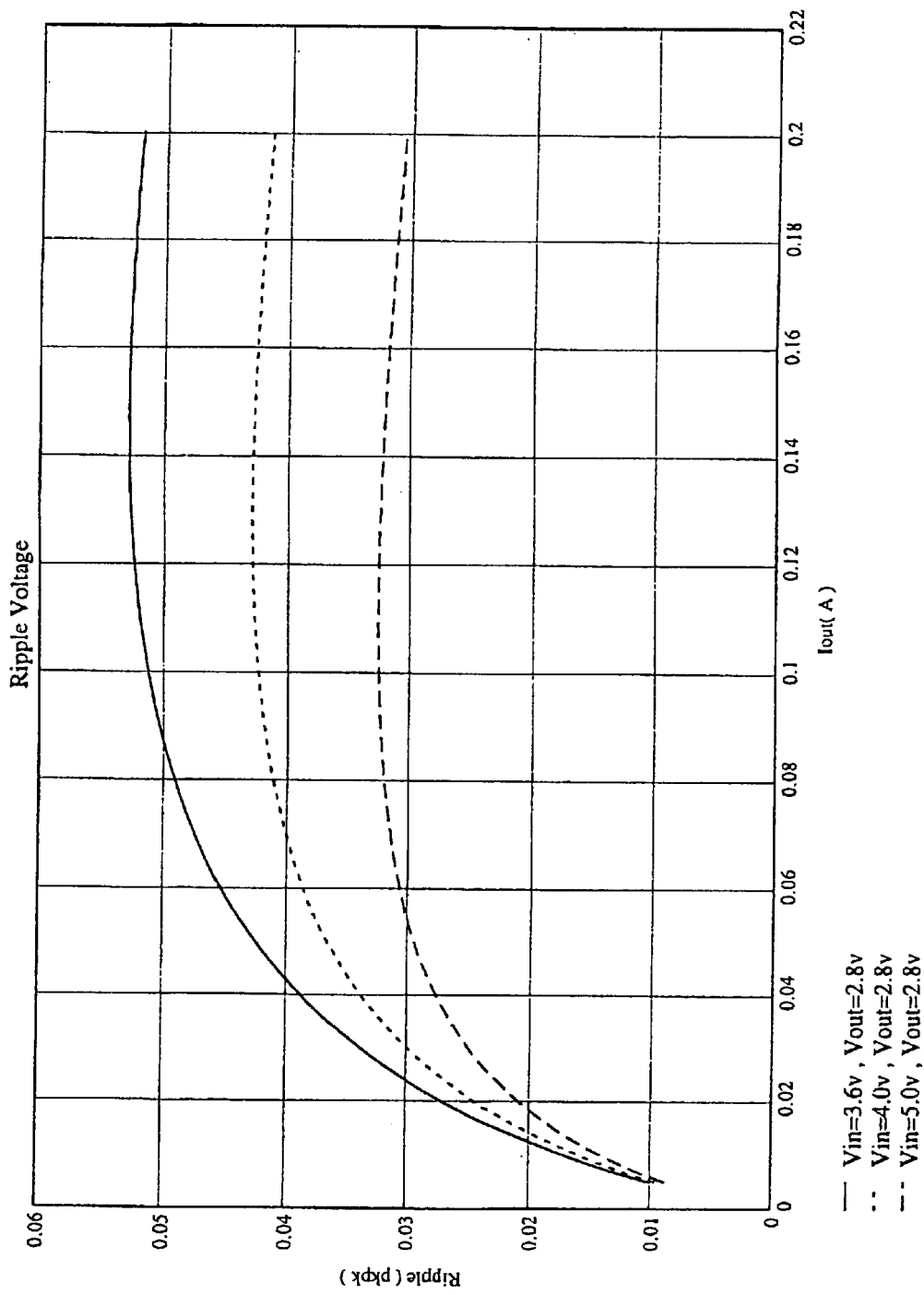
FIG. 7 is a graph showing ripple voltage calculated in accordance with a ripple voltage equation.

The ripple voltage at the output of converter 100 is determined by the load current, the size of the output filter capacitor, and the PRF of converter 100. For a buck converter operating in discontinuous mode, the ripple voltage is approximated by Equation 3 for T>>(t1+t2), which ignores the effects of non-linear inductor current and output capacitor ESR. This equation is plotted in FIG. 7 for several line and load conditions.

$$\frac{I_{OUT} \cdot t_{PULSE}}{PRF \cdot C_{OUT}} \approx V_{RIPPLE}(\text{Peak-to-Peak}) \qquad \text{Equation 3}$$

Many applications can tolerate a significant amount of ripple voltage when they are in the low-power mode. Other applications require tighter control of the amount of ripple voltage, particularly applications needing to achieve reduced cost and volume through the use of smaller values of output capacitance. As shown by Equation 3, the use of smaller output capacitors causes the ripple voltage to increase. It is desirable to provide a method to control the ripple voltage in these applications.

Figure 9:
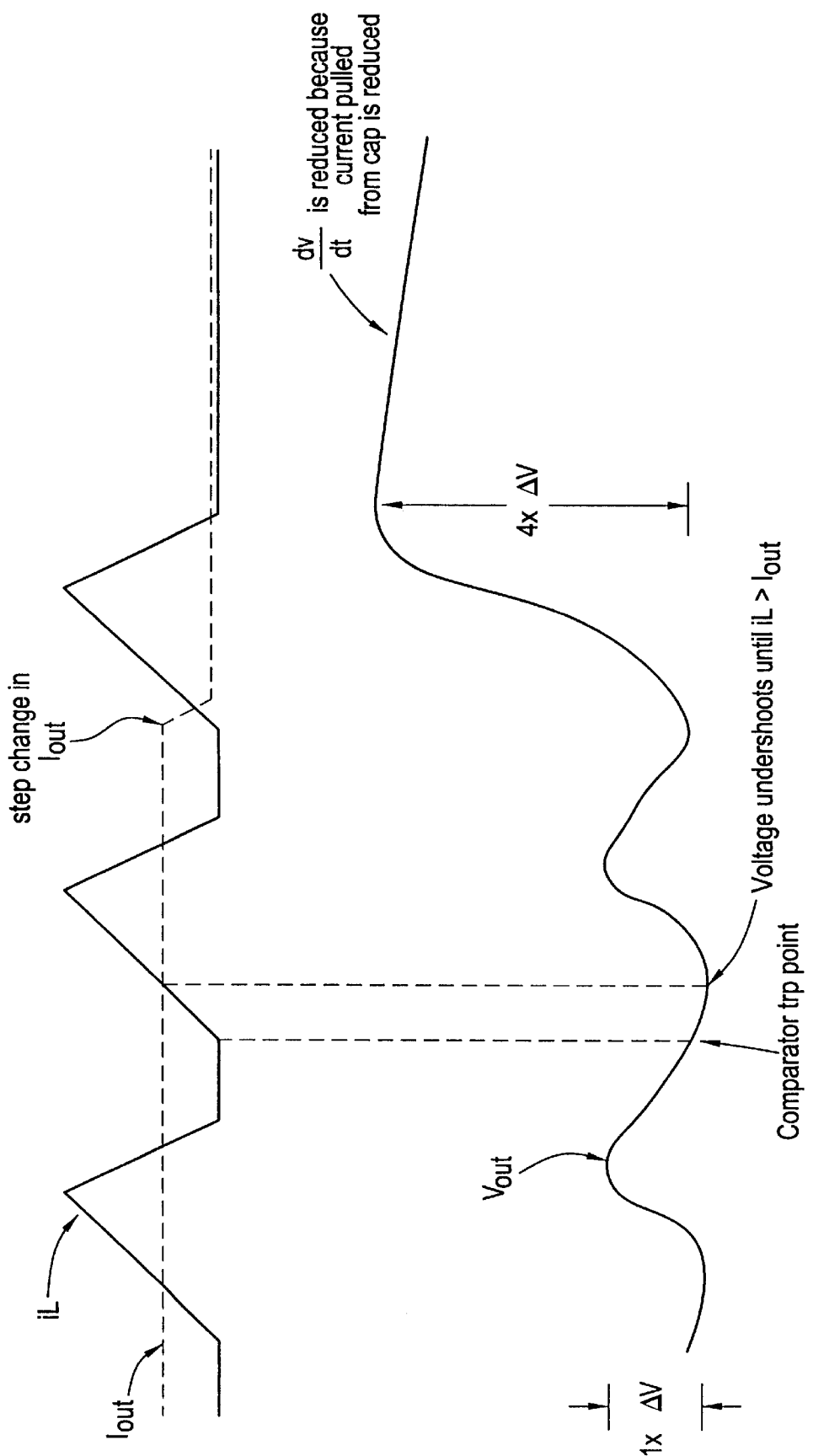
FIG. 9 is a graph of an output voltage waveform showing undesirable overshoot conditions due to the presence of excess inductor current that overcharges an output capacitor.

An additional requirement exists for converters having small valued output capacitors, with significant load transient requirements. If the load current changes faster than the time required to complete the inductor charge and discharge cycle, the potential exists for large output voltage transients to occur. This can happen if the load current decreases significantly immediately after a switch cycle has started; the inductor will be charged to a peak current value that was appropriate for the previous load current, but is too high for the new, lower load current. The excess inductor current will overcharge the output capacitor, and cause the output voltage to overshoot. If a small valued output capacitor is used, this overshoot can be significant. This situation is illustrated in FIG. 9. Referring now to FIG. 9, $I_{OUT}$ drops significantly after the third switch cycle has started, leading to a significant overshoot condition.

Therefore, a most preferred embodiment of the present invention includes circuitry to monitor the output voltage, $V_{OUT}$, and control the inductor charging current to prevent this problem. Referring again to FIG. 8, voltage comparator 203 monitors the output ripple voltage via a voltage feedback signal, $V_{fb}$, and terminates the inductor charging portion of the cycle early if the ripple voltage exceeds a pre-determined value, $V_{ref}$. This is accomplished by voltage comparator 203 outputting a signal to controller 209 to turn off SW1 and turn on SW2. The early termination of the inductor charging cycle thus limits the excess current in the inductor and thereby prevents the output voltage, $V_{out}$, from rising above the desired value.

In a most preferred embodiment, converter 100 provides a hysteresis function for voltage comparator 203. Voltage comparator 203 initiates a switch cycle by sensing when the output voltage, $V_{OUT}$, has dropped below a preset value. By adding hysteresis to the input threshold values, the switching range of comparator 203 is increased. The threshold voltages are preferably shifted by, for example, forcing a small amount of current into the loads of the comparator input, or, alternatively, by changing the reference voltage, $V_{ref}$, applied to the comparator. In a most preferred embodiment, controller 207 provides an Offset Control signal 209 to the input of voltage comparator 203. Voltage comparator 203 then shifts the threshold voltages in response to the Offset Control signal 209. Referring again to FIG. 9, when $V_{OUT}$ is increasing, voltage comparator 203 with hysteresis switches based on the comparison between $V_{HIGH}$ and $V_{OUT}$. Conversely, when $V_{OUT}$ is decreasing, voltage comparator 203 with hysteresis switches based on the comparison between $V_{LOW}$ and $V_{OUT}$. The effect of the hysteresis is to increase the range of the switching thresholds for voltage comparator 203.

In an alternative embodiment, a second comparator may be added to sample the output voltage of the power converter just before the inductor starts to charge. The trip point of this second comparator is set to a fixed amount above the sampled voltage. This second comparator will turn on if the output voltage increases by more than the desired amount during the inductor charging time of the switch cycle.

Referring again to FIG. 8, in a preferred embodiment, converter 100 includes an OR gate 205 which receives as inputs the inductor charging current control signals from both current comparator 201 and voltage comparator 203. The output of OR gate 205 is provided to controller 207 as a single inductor charging current control signal. Converter 100 thus regulates the output voltage, $V_{OUT}$, by monitoring both output voltage and inductor current conditions.

In a first alternative embodiment, converter 100 uses Sigma Delta Modulation (SDM) to modulate the desired inductor current value, $I_L$, based on the number of free running clock cycles between inductor charging current pulses. Specifically, a digital counter is used to count the number of clock cycles between successive inductor charging current pulses. If too many current pulses are present, then, $I_{PEAK}$ is decreased by one or more steps. If too few current pulses are present, then, $I_{PEAK}$ is increased by one or more steps. A disadvantage of this alternative approach is that a digital clock is required, which consumes additional current. Further, a converter according to this alternative embodiment may be hard to stabilize in the presence of rapid changes in $I_L$. Still further, beat frequencies could be introduced by controlling the period between inductor charging current pulses, possibly in the audio frequency range.

In a second alternative embodiment, instead of digitally counting clock pulses, analog measurement means is used to measure the time between inductor charging current clock pulses. Specifically, the analog voltage state of a capacitor with known rate of discharge is used to measure the time between inductor charging current clock pulses. This eliminates the digital clock power increase problem, but not the other cited problems of the first alternative embodiment.

Thus, a method and apparatus has been shown for a power converter having reduced switching frequency and having a control circuit with reduced power requirements and effective DC and transient regulation.

While the above description contains many specifics, these should not be construed as limitations on the scope of the invention, but rather as exemplification. Other variations are possible. Accordingly, the scope of the present invention should be determined not by the embodiments illustrated above, but by the appended claims and their legal equivalents.

What is claimed is:

1. A power converter operating in a discontinuous mode and having a charge storage capacitor connected across a pair of output terminals, said power converter comprising:
   a power source;
   a first switch for controllably connecting said power source to an inductor, said inductor connected to a first one of said pair of output terminals;
   a second switch for controllably connecting said inductor to a second one of said pair of output terminals; and
   a controller connected to said first switch and to said second switch and providing control signals thereto, said controller adjusting a switching frequency of said control signals and adjusting a peak inductor current trip point according to a control law curve.

2. The power converter of claim 1, wherein said control law curve is characterized by a minimum switching frequency.

3. The power converter of claim 2, wherein said minimum switching frequency is above 20 kilohertz.

4. The power converter of claim 2, wherein said control law curve is characterized by a maximum current limit.

5. The power converter of claim 4, wherein said switching frequency increases as said peak inductor current trip point increases, and decreases as said peak inductor current trip point decreases, according to said control law curve, said switching frequency selected such that said peak current trip point approaches but does not exceed said maximum current limit as load impedance decreases.

6. The power converter of claim 4, wherein said peak inductor current trip point increases as said switching frequency increases, and decreases as said switching frequency decreases, according to said control law curve, said peak inductor current trip point selected such that said switching frequency approaches but does not fall below said minimum switching frequency as load impedance increases.

7. The power converter of claim 1, wherein said control law curve compensates for variations in component values within said power converter by adaptively adjusting an operating point of said controller on said control law curve.

8. The power converter of claim 1, wherein said control law curve maintains the efficiency of said power converter at a relatively constant level over a majority of its operating region.

9. The power converter of claim 1, further comprising:
    a current sense circuit for measuring a current through said inductive element, said current sense circuit providing a current sense signal to said controller; and
    a voltage sense circuit for measuring an output voltage of said power converter, said voltage sense circuit providing a voltage sense signal to said controller.

10. An apparatus for facilitating power conversion, comprising:
    an inductor current sensing circuit for measuring a level of current through an inductive energy storage element used in the power converter;
    a voltage sensing circuit for measuring an output voltage of the power converter; and
    a control circuit for regulating a converter output signal in a switched mode control loop and for operating the power converter in a discontinuous switched operating mode, said control circuit comprising
        a plurality of control signals for controlling electrical switches used in transferring power from an energy source to the converter output signal; and
        a controller for simultaneously and adaptively modulating a peak current trip point of said inductor current sensing signal and a switching frequency of said control signals according to a predefined relationship so as to maintain said converter output signal at a desired DC voltage, while preventing said switching frequency from falling below a predetermined minimum frequency.

11. The apparatus of claim 10, wherein said control circuit is incorporated in a step-down power converter.

12. The apparatus of claim 10, wherein said predetermined minimum frequency is above 20 kilohertz.

13. The apparatus of claim 10, wherein said controller modulates said peak current trip point and said switching frequency according to a control law curve, said control law curve selected so as to keep the efficiency of said power converter relatively constant.

14. The apparatus of claim 13, wherein said control law curve is selected so as to prevent said switching frequency from falling below said predetermined minimum frequency and to prevent said level of current through said inductive energy storage element from exceeding a predetermined peak value.

15. The apparatus of claim 10, further comprising:
    a first electronic switch having an input connected to a first control signal of said plurality of control signals of said controller, said first electronic switch having a first pair of switch terminals, a first one of said first pair of switch terminals connected to said power source;
    a second electronic switch having an input connected to a second control signal of said plurality of control signals of said controller, said second electronic switch having a second pair of switch terminals, a first one of said second pair of switch terminals connected to a second one of said first pair of switch terminals of said first switch, said second pair of terminals being connected across said inductive energy storage element and a charge storage capacitor; and
    a resistive feedback network connected across said pair of converter output terminals, said resistive feedback network generating a voltage feedback signal to said control circuit in response to said converter output signal.

16. A method of regulating an output of a power converter, said method comprising the steps of:
    (a) connecting, through a first controllable switch, an energy source to an inductive element so as to allow an increase in a current level and stored energy in said inductive element;
    (b) disconnecting said energy source from said inductive element by turning off said first controllable switch when said current level through said inductive element reaches an adjustable trip level;
    (c) connecting, through a second controllable switch and after said first controllable switch is disconnected, said inductive element to a charge storage capacitor, said charge storage capacitor being connected between a pair of output terminals of said power converter, so as to allow the decrease of said current flowing through said inductive element, with the energy stored in said inductive element being transferred to said charge storage capacitor;
    (d) disconnecting said inductive element from said charge storage capacitor by turning off said second controllable switch when said current flowing through said inductive element reaches a predetermined minimum floor; and
    (e) repeating steps (a) through (d) at an adjustable frequency so as to regulate operation of the power converter at an output voltage level by adaptively and simultaneously selecting said adjustable frequency and said adjustable trip level according to a control law curve, whereby said adjustable frequency is maintained above a predetermined minimum frequency.

17. The method of claim 16, wherein said adjustable frequency and said adjustable trip level are selected at least in part in response to a measured output voltage level.

18. The method of claim 17, wherein said adjustable trip level is generated by applying a measured voltage across said charge storage capacitor to a buffer amplifier having an output coupled to ground through a resistive network, and producing a current thereby.

19. The method of claim 16, wherein said steps (a) through (e) effectuate discontinuous switching mode operation of the power converter in order to regulate said output voltage level.

20. The method according to claim 16 wherein said predetermined minimum frequency is above 20 kilohertz.

21. A power converter, comprising:
- an input terminal for receiving an input voltage signal;
- a pair of output terminals for providing a converter output voltage signal;
- a first electronic switch;
- a second electronic switch, said first electronic switch connected between said input terminal and said second electronic switch;
- an inductive energy storage element connected between the output of said first electronic switch and said first output terminal;
- a charge storage capacitor connected between the output of said inductive element and said second output terminal;
- a resistive feedback network connected between said output terminals, said resistive feedback network generating a voltage feedback signal in response to said output voltage signal; and
- a control circuit, said control circuit including:
  - a controller having a first drive signal controllably connected to said first electronic switch and a second drive signal controllably connected to said second electronic switch;
  - an output voltage sensing circuit that produces a first current control signal in response to said voltage feedback signal;
  - a current sensing circuit that produces a second current control signal in response to a level of current through said inductive energy storage element; and
  - a signal adder that produces an inductor current charging signal in response to said first current control signal or said second current control signal;
- wherein said controller modulates said first drive signal and said second drive signal to prevent a switching frequency of said first drive signal and said second drive signal from falling below a predetermined minimum frequency; and
- wherein said controller automatically and dynamically establishes a combination of a peak inductor current level and said switching frequency according to a control law curve so as to regulate said converter output voltage signal at a consistent level.

22. The power converter of claim 21 wherein said controller modulates said first drive signal and said second drive signal to control the current through said inductive energy storage element according to said control law curve in response to said inductor current charging signal; and
- said control law curve automatically selecting a particular combination of said peak inductor current level and said switching frequency in order to regulate said converter output voltage signal in response to different values of said level of current caused by variations in the values of said charge storage capacitor and said inductive energy storage element.

23. The power converter of claim 21 wherein said predetermined minimum frequency is about 20 KHz.

24. The power converter of claim 21, wherein said output voltage sensing circuit monitors the voltage ripple present in said output voltage signal and sets said first current control signal to a state that will cause said controller to terminate said level of current through said inductive element in response to a voltage ripple value present at said first output terminal exceeding a predetermined value.

25. The power converter of claim 21, wherein said output voltage sensing circuit controls a switching threshold of said voltage sensing circuit using a controlled offset to increase the range of said voltage sensing circuit.

26. The power converter of claim 21, wherein said control circuit further comprises a control voltage generator that produces a voltage control signal in response to said inductor current charging signal, said control voltage signal being converted to a peak inductor current control signal and provided to said current sensing circuit.

27. A control circuit for a power converter of the type having a pair of output terminals, a first electronic switch connected between an input terminal and a second electronic switch, an inductive energy storage element connected between an output of said first electronic switch and said first output terminal, and a charge storage capacitor connected between an output of said inductive energy storage element and said second output terminal, comprising:
- a resistive feedback network that generates a voltage feedback signal in response to an output voltage signal;
- a controller having a first drive signal connected to said first electronic switch and a second drive signal connected to said second electronic switch;
- an output voltage sensing circuit that produces a first current control signal in response to said voltage feedback signal;
- a current sensing circuit that produces a second current control signal in response to a level of current through said inductive energy storage element;
- a signal adder that produces an inductor current charging signal in response to said first current control signal or said second current control signal; and
- said controller modulating said first drive signal and said second drive signal to prevent a switching frequency of said first drive signal and said second drive signal from falling below a predetermined minimum frequency, and said controller automatically adjusting a peak current trip point and said switching frequency according to a control law curve so as to maintain the output voltage at a consistent level.

28. The power converter of claim 27 wherein said predetermined minimum frequency is above 20 kilohertz.

29. In a power converter having a capacitor connected across a pair of converter output terminals, a method for converting power supplied by a DC power source, comprising the steps of:
- receiving a power source signal from the DC power source;
- controllably connecting, through a first electronic switch operating at a controllable frequency, said power source signal to an inductive energy storage element, said first electronic switch and said inductive energy storage element forming a loop with the DC power source through which current can flow;
- controllably connecting, through a second electronic switch operating at said controllable frequency, said inductive energy storage element to said capacitor across said converter output terminals, said second electronic switch and said inductive energy storage element forming a loop with said capacitor through which current can flow;
- generating a first current control signal in response to an output voltage measured across the pair of converter output terminals;
- generating a second current control signal in response to a level of current measured through said inductive energy storage element;

utilizing said first current control signal and said second current control signal in alternation to produce an inductor current charging signal;

modulating the inputs of said first electronic switch and said second electronic switch to cause operation at said controllable frequency in response to said inductor current charging signal;

preventing the switching frequency of said controllable frequency from falling below a predetermined minimum frequency; and adaptively selecting a predefined combination of a peak inductor current level and controllable frequency according to a control law curve in order to regulate said output voltage at a consistent level.

30. The method of claim 29 wherein said predetermined minimum frequency is about 20 kilohertz.

31. The method of claim 29 wherein said step of generating a first current control signal further includes setting said first current control signal to a state that will cause said first electronic switch and said second electronic switch to terminate current flow through said inductive element in response to a voltage ripple value present at said first output terminal exceeding a predetermined value.

* * * * *